US012755390B2

(12) United States Patent
Pourian

(10) Patent No.: US 12,755,390 B2
(45) Date of Patent: Oct. 6, 2026

(54) ENHANCED MULTI-VIEW BACKGROUND MATTING FOR VIDEO CONFERENCING

(71) Applicant: Intel Corporation, Santa Clara, CA (US)

(72) Inventor: Niloufar Pourian, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/146,927

(22) Filed: Dec. 27, 2022

(65) Prior Publication Data

US 2024/0212098 A1 Jun. 27, 2024

(51) Int. Cl.
*G06T 7/11* (2017.01)
*G06T 7/194* (2017.01)

(52) U.S. Cl.
CPC ................ *G06T 7/11* (2017.01); *G06T 7/194* (2017.01); *G06T 2207/10016* (2013.01); *G06T 2207/10028* (2013.01); *G06T 2207/20084* (2013.01)

(58) Field of Classification Search
CPC ... G06T 7/10; G06T 7/11; G06T 7/194; G06T 2207/20081; G06T 2207/20084; G06T 2207/10028; G06T 7/50; G06T 7/55; G06T 7/593; G06T 7/596; G06T 2207/10016; G06T 2207/10021; G06N 3/02–0985; H04N 5/2226; H04N 5/272
See application file for complete search history.

(56) References Cited

U.S. PATENT DOCUMENTS

2017/0358092 A1* 12/2017 Bleibel .................. H04N 5/272
2022/0191431 A1* 6/2022 Oz .......................... G06T 19/00
2023/0360177 A1* 11/2023 Lee ........................ G06N 20/20

OTHER PUBLICATIONS

Hou, Qiqi, and Feng Liu. "Context-Aware Image Matting for Simultaneous Foreground and Alpha Estimation." 2019 IEEE/CVF International Conference on Computer Vision (ICCV). IEEE, 2019. (Year: 2019).*
Chen, Junfeng, et al. "Real-time multi-view background matting for 3D light field video." AOPC 2021: Micro-optics and MOEMS. vol. 12066. SPIE, 2021. (Year: 2021).*
Levin, Anat, et al., "A Closed-Form Solution to Natural Image Matting." IEEE Transactions on Pattern Analysis and Machine Intelligence, vol. 30, No. 2, Feb. 2008, pp. 228-242.
Sengupta, Soumyadip, et al., "Background Matting: The World is Your Green Screen." University of Washington, arXiv:2004.00626v2 [cs.CV], Apr. 10, 2020, 16 pgs.
(Continued)

*Primary Examiner* — Geoffrey E Summers
(74) *Attorney, Agent, or Firm* — Hanley, Flight & Zimmerman, LLC

(57) ABSTRACT

This disclosure describes systems, methods, and devices related to video background matte generation. A method may include receiving, by a first neural network trained to generate alpha mattes and foreground multi-camera images, first inputs generated by a second neural network; receiving, by the first neural network, second inputs comprising gray-scale images and depth maps of the multi-camera images; and generating, by the first neural network, based on the first inputs and the second inputs, multi-view alpha mattes and multi-view foreground estimates for the multi-camera images.

20 Claims, 9 Drawing Sheets

(56) References Cited

OTHER PUBLICATIONS

Joshi, Neel, et al., "Natural Video Matting Using Camera Arrays." Mitsubishi Electric Research Laboratories, Jul. 2006, 10 pgs.

Lin, Shanchuan, et al., "Real-Time High-Resolution Background Matting." University of Washington, arXiv:2012.07810v1 [cs.CV], Dec. 14, 2020, pp. 1-16.

Lin, Shanchuan, et al., "Robust High-Resolution Video Matting with Temporal Guidance." University of Washington and ByteDance Inc., arXiv:2108.11515v1 [cs.CV], Aug. 25, 2021, pp. 1-14.

Chen, Qifeng, et al., "KNN Matting." IEEE Transactions on Pattern Analysis and Machine Intelligence, vol. 35, No. 9, Sep. 2013, pp. 2175-2188.

Hyunjinku and Facebook-Github-Bot, PixFlow; https://github.com/facebook/Surround360/tree/master/surround360_render/source/optical_flow, archived on Aug. 31, 2021.

* cited by examiner

400

420

440

450

ENHANCED MULTI-VIEW BACKGROUND MATTING FOR VIDEO CONFERENCING

TECHNICAL FIELD

This disclosure generally relates to devices, systems, and methods for video processing, and more particularly, to background matting for multi-camera views.

BACKGROUND

Video conferencing applications make it easy to connect friends, colleagues, and family online. Some techniques use only a single camera, a green screen background, or a manually generated tri-map, but may not provide sufficient quality with a coherent background matte.

DETAILED DESCRIPTION

Figure 1:
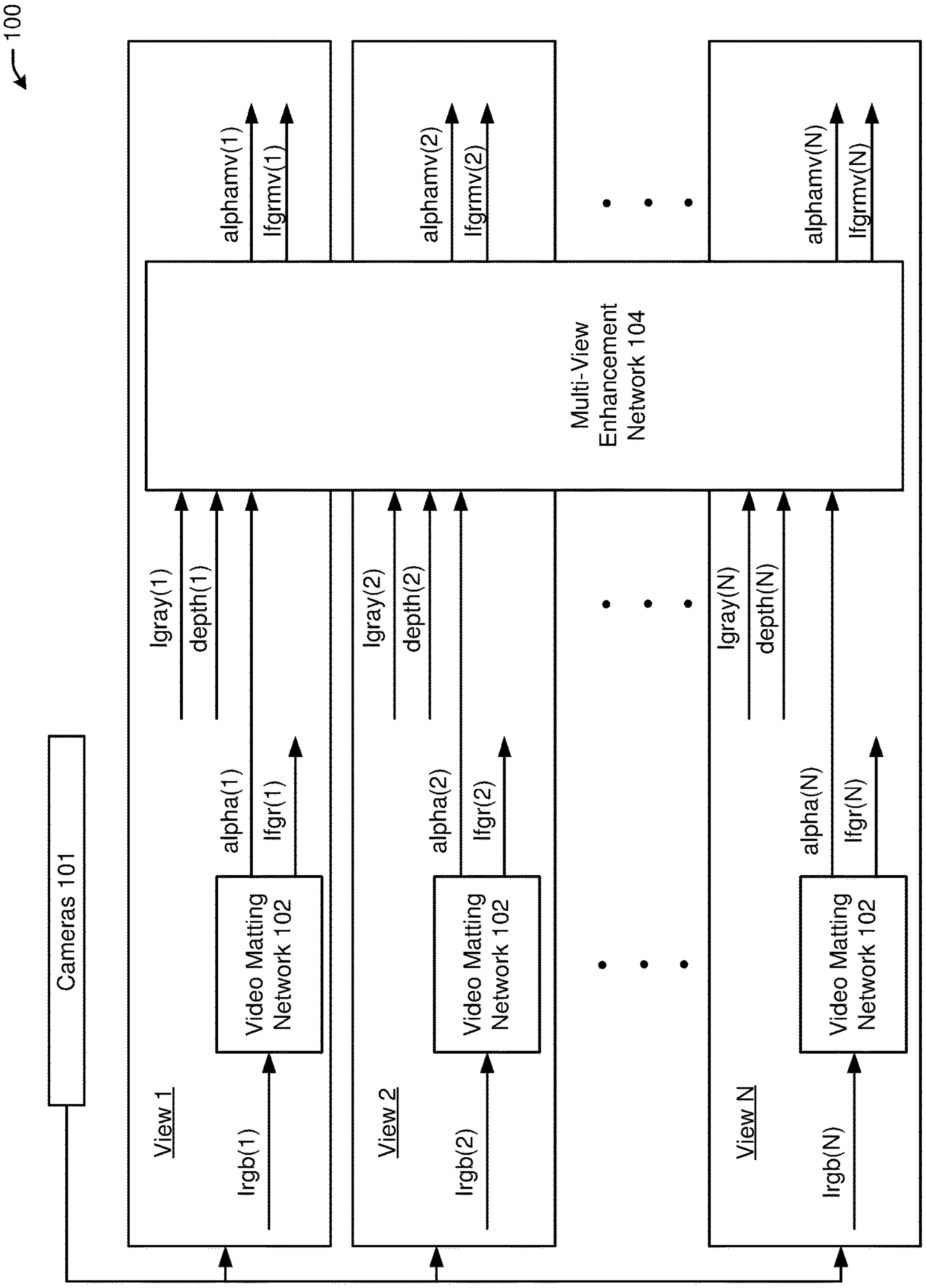
FIG. 1 illustrates an example system for multi-camera view background matting, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In one or more embodiments, the present disclosure provides a spatially coherent human background matting technique across different views of a multi-camera system. The model presented herein builds on a human background matting network by introducing a secondary network as a multi-view enhancement network that takes advantage of multiple cameras in the system to improve accuracy of the foreground/background segmentation while maintaining view to view segmentation consistency. The proposed approach may recover an object held by a human in addition to the human as foreground content.

In one or more embodiments, the techniques of the present disclosure do not require any auxiliary input from the user to achieve background matting, and can achieve spatially coherent background/foreground segmentation results across different views in a multi-camera system.

In one or more embodiments, per-camera depth maps used as inputs to the multi-view enhancement network (e.g., a second neural network) may be computed by triangulation using optical flow maps estimated between each stereo pair of cameras and the camera calibrations of the multi camera system that is pre-computed using a checkerboard as the calibration target. The depth maps may be pre-computed and available as part of a view interpolation pipeline. The proposed framework is not dependent on a particular approach for computing the per-camera depth maps.

In one or more embodiments, background matting as an independent feature is valuable for video conferencing applications. In addition, background matting can be used as additional cues to enhance the accuracy of tracking and optical flow estimations, and hence the view interpolation results. Such a feature is valued in generating immersive virtual reality content in 360 degree camera arrays.

In one or more embodiments, the enhanced techniques herein define an end-to-end framework to spatially coherent human background matting in a multi-camera system. The model uses the information across different cameras to define a background/foreground segmentation that is consistent across different views. The foreground mask includes not only the human, but also the object being held by the human. The techniques can process high resolution videos at HD 50 fps for each camera on a single GPU, for example.

In one or more embodiments, the enhanced techniques herein include multiple neural networks. The first network inputs captured videos/images from a single camera/view and is trained for both matting and human segmentation objectives. The network takes advantage of a recurrent neural network to enforce temporal consistency between the background/foreground segmentation results in each view. When analyzing the background/foreground segmentation results across different views at the output of the first network, there may be inconsistencies. Such spatial inconsistencies are mostly seen in an object being held by a human. Depending on the viewing angle, the object may be segmented as part of the human body and hence marked as foreground in some views, while the object may be further away from the human body and hence marked as background in other views. In the present disclosure, the enhanced techniques take advantage of such spatial inconsistencies across different views at the output of the first network to define a spatially coherent background/foreground segmentation which includes both the human and the object they are presenting. This is done via a second neural network with a similar architecture as the first network.

In one or more embodiments, unlike the first neural network, the second neural network inputs the gray scale images, depth maps, and the estimated alpha mattes at the output of the first network (e.g., applied to each camera independently) across all cameras, and is trained to estimate alpha mattes that are spatially coherent. A loss function may be defined as the sum of the L1 norm between the estimated alpha matte and the ground truth alpha mattes and the L1 norm defined between the estimated foreground and the ground truth foreground (see Equation 1 below). For each view, foreground images are defined using the gray scale images and their corresponding alpha mattes.

$$\text{loss} = \sum_{v=1}^{N} \left( \left|\text{alpha}_{mv}^{Predicted}(v) - \text{alpha}_{mv}^{GT}(v)\right| + \left|Ifgr_{mv}^{Predicted}(v) - Ifgr_{mv}^{PT}(v)\right| \right), \tag{1}$$

which is explained further below.

In one or more embodiments, using an array of cameras to capture videos, per-camera depth maps are estimated via triangulation using optical flow estimates between stereo pair of cameras and camera calibrations and are already available as part of a view interpolation pipeline. The proposed techniques estimate spatially coherent background matting (and hence foreground) results across all cameras and are capable of defining both the human and the object being presented as foreground without any additional cues from the user.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 illustrates an example system 100 for multi-camera view background matting, in accordance with one or more example embodiments of the present disclosure.

Figure 3A:
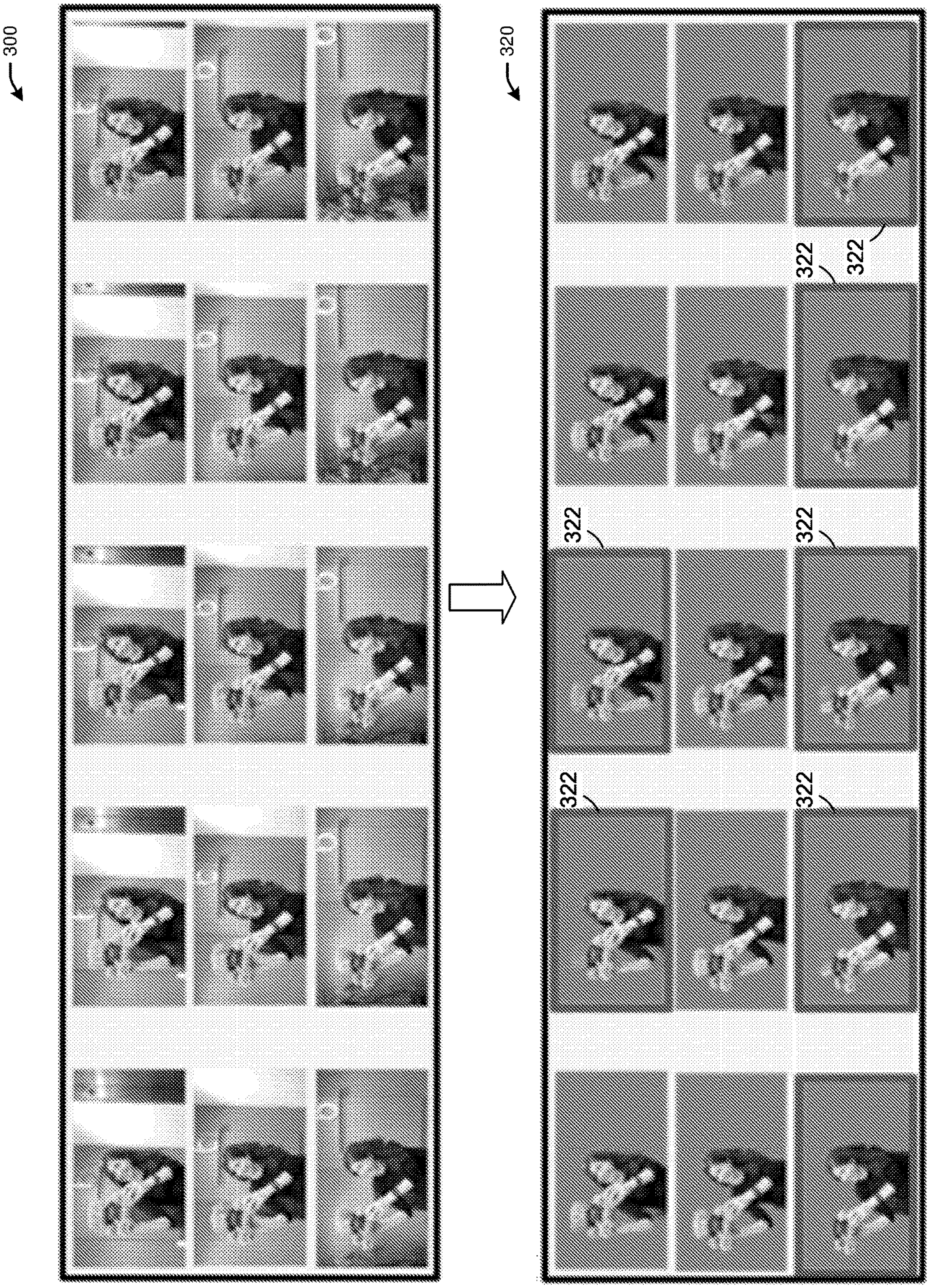
FIG. 3A shows example video frames and foreground masks for the video frames using a video matting network, in accordance with one or more example embodiments of the present disclosure.

Referring to FIG. 1, the system 100 may include cameras 101 (e.g., an array of multiple cameras of one or more devices capturing images of a person and/or objects, such as shown in FIG. 3A) whose image data for multiple camera views (e.g., view 1, view 2, . . . , view N) may be input to a video matting network 102 (e.g., a human video matting neural network). For each camera view, a RGB (red-green-blue) image $I_{rgb}(\mathbf{1})$, $I_{rgb}(\mathbf{2})$, . . . , $I_{rgb}(N)$ may be input to the video matting network 102. For each RGB image, the video matting network 102 may generate an alpha mattes (e.g., alpha(1), alpha(2), . . . , alpha(N)) and foreground images (e.g., $I_{fgr}(\mathbf{1})$, $I_{fgr}(\mathbf{2})$, . . . , $I_{fgr}(N)$), and the alpha mattes may be inputs to a second neural network, a multi-view enhancement network 104. For each view, additional inputs to the multi-view enhancement network 104 may include a gray-scale image (e.g., $I_{gray}(\mathbf{1})$. $I_{gray}(\mathbf{2})$, . . . , $I_{gray}(N)$) and a depth map (e.g., depth(1), depth(2), . . . , depth(N)) generated by the respective images of the different camera views. Based on the inputs of the multiple different camera views, the multi-view enhancement network 104 may be trained to generate multiple outputs including multi-view alpha mattes (e.g., $\text{alpha}_{mv}(1)$, $\text{alpha}_{mv}(\mathbf{2})$, . . . , $\text{alpha}_{mv}(N)$) and multi-view foreground images (e.g., $I_{fgr}(\mathbf{1})$, $I_{fgr}(\mathbf{2})$, . . . , $I_{fgr}(N)$).

In one or more embodiments, the multi-view enhancement network 104 reduces the difference between the alpha matte of each view and the ground truth of each view, and minimizes the collective differences between the alpha mattes of each view and their respective ground truths across all views. This collective difference represents the $$lpha_{mv}^{Predicted}(v) - \text{alpha}_{mv}^{GT}(v)$$

of Equation (1) above. For additional improvement, the multi-view enhancement network 104 may account for the foreground loss, which represents the $$Ifgr_{mv}^{Predicted}(v) - Ifgr_{mv}^{GT}(v)$$

of Equation (1) above. In this manner, for each view, the multi-view enhancement network 104 minimizes the difference between the ground truth foreground $$Ifgr_{mv}^{GT}$$

output by the multi-view enhancement network 104 and the predicted foreground $$Ifgr_{mv}^{Predicted}(v)$$

collectively for all views. The ground truths may be provided to the multi-view enhancement network 104 (e.g., using annotated data). The multi-view enhancement network 104 predicts the foreground images and alpha mattes for any view based on the inputs of that view. Because the multi-view enhancement network 104 may be a deep-learning neural network, the multi-view enhancement network 104 may predict the loss according to Equation (1), and then penalize based on the loss, adjusting weights of the neural network to achieve a smaller and smaller loss through each iteration until the loss is stabilized (e.g., no longer reduces). As a result, the multi-view enhancement network 104 may be trained so that the inputs from the different views may be received without ground truths so that the trained multi-view enhancement network 104 may generate the outputs as shown in FIG. 1.

In one or more embodiments, the multi-view enhancement network 104 may be a recurrent neural network (RNN), a convolutional neural network (CNN), or a generative adversarial neural network (GAN), deep reinforcement learning, with enforcing priors (e.g., using prior loss predictions to enforce consistency of future loss predictions), for example, among other types of deep-learning networks.

Figure 2:
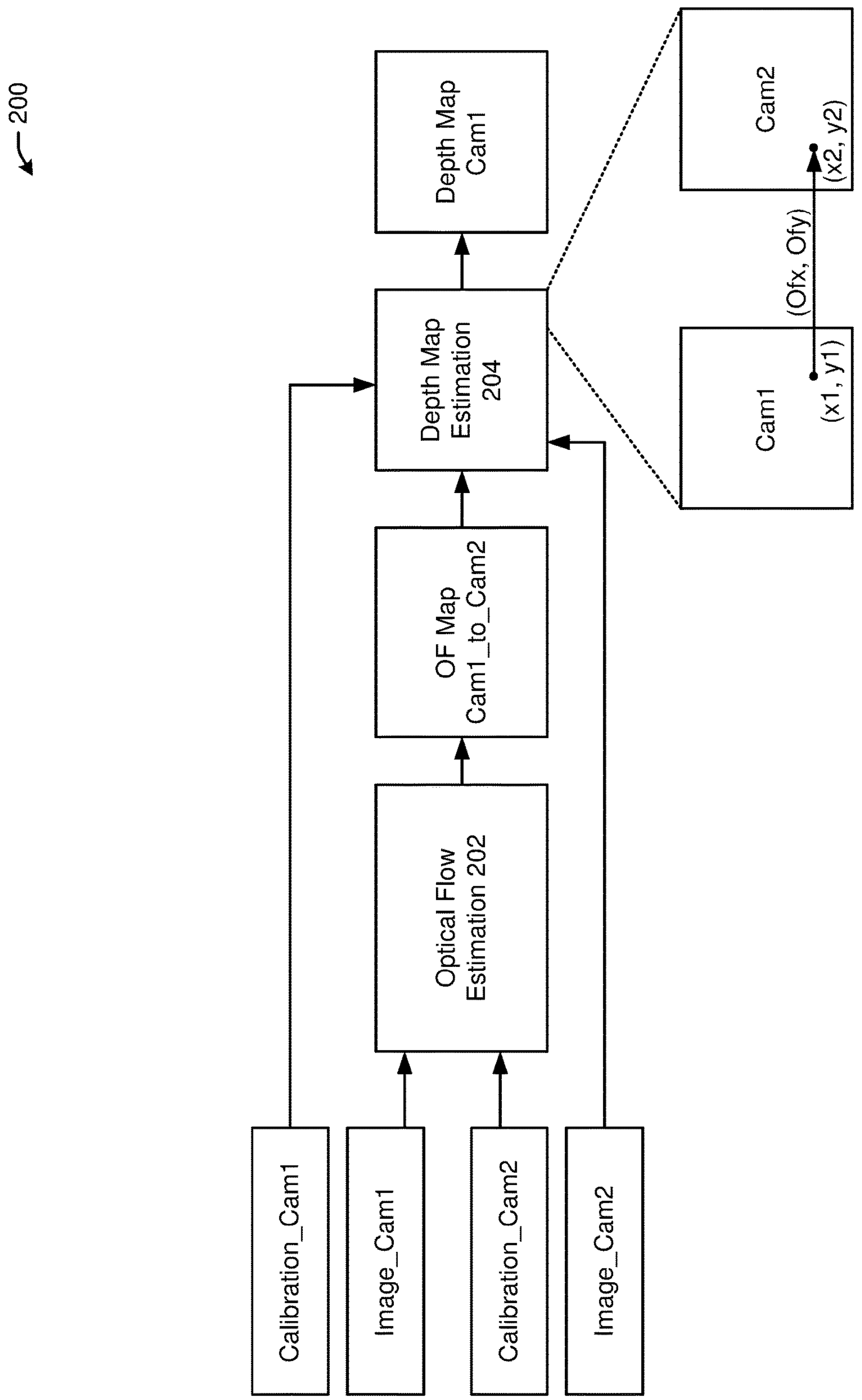
FIG. 2 illustrates an example process for estimating per-camera depth maps, in accordance with one or more example embodiments of the present disclosure.

FIG. 2 illustrates an example process 200 for estimating per-camera depth maps, in accordance with one or more example embodiments of the present disclosure.

Referring to FIG. 2, the process 200 may include image data (e.g., image_cam1 from cam1 representing a first camera of the cameras 101 of FIG. 1, image_cam2 from cam2 representing a second camera of the cameras 101) and calibration data (e.g., calibration_cam1, calibration_cam2). The image data may be input to an optical flow estimation 202 algorithm, which may generate an optical flow (OF) map from cam1_to_cam2 (e.g., map cam1_to_cam2) to map coordinates $x_1$, $y_1$ of camera 1 to coordinates $x_2$, $y_2$ of camera 2 (e.g., Ofx, Ofy). The map may be input to a depth map estimation 204 algorithm, which may generate a depth map (e.g., depth map cam1) for any camera view.

In one or more embodiments, the depth map estimation 204 algorithm may use the following equations:

$$x_2 = x_1 + ofx;$$

$$y_2 = y_1 + ofy;$$

$$wp_1 = \left[(x_1 - ppt_{x1}) \times \frac{1}{f_{x1}},\ (y_1 - ppt_{y1}) \times \frac{1}{f_{y1}},\ 1\right] \times R_1';$$

$$w_{p2} = \left[(x_2 - ppt_{x2}) \times \frac{1}{f_{x2}},\ (y_2 - ppt_{y2}) \times \frac{1}{f_{y2}},\ 1\right] \times R_2';$$

$$b = T_2 - T_1;$$

$$d_1 = \frac{|b \times wp_2|}{|wp_1 \times wp_2|};$$

Where ($ppt_{xi}$, $ppt_{yi}$) represent the principle point of camera i, ($f_{xi}$, $f_{yi}$) represent a focal point of camera i, ($R_i$, $T_i$) represent the rotation and translation defined by the extrinsic calibrations of camera i, $R_i'$ is the transpose of the rotation matrix $R_i$ for camera i, ($of_{xi}$, $of_{yi}$) represent the optical flow map of camera i to camera i+1, and $d_i$ represents the depth map of camera i (e.g., generated by the depth map estimation 204 algorithm). The process 200 of FIG. 2 is an example way of generating depth maps to be input to the system 100 of FIG. 1, but is not the only way that depth maps may be generated. Other depth map generation techniques may be implemented.

FIG. 3A shows example video frames 300 and foreground masks 320 for the video frames 300 using a video matting network, in accordance with one or more example embodiments of the present disclosure.

Referring to FIG. 3A, the video frames 300 may be captured by the cameras 101 of FIG. 1, and may show a person holding an object (e.g., a teddy bear). The foreground masks 320 may be generated by the video matting network 102 of FIG. 1. Boxes 322 are shown to highlight estimated foregrounds where parts of the foreground are missing. In one or more embodiments, the foreground masks 320 may represent the $I_{fgr}$ images of FIG. 1. In this manner, the $I_{fgrmv}$ images generated by the multi-view enhancement network 104 of FIG. 1 may improve upon the foregrounds 320 generated by the video matting network 102.

Figure 3B:
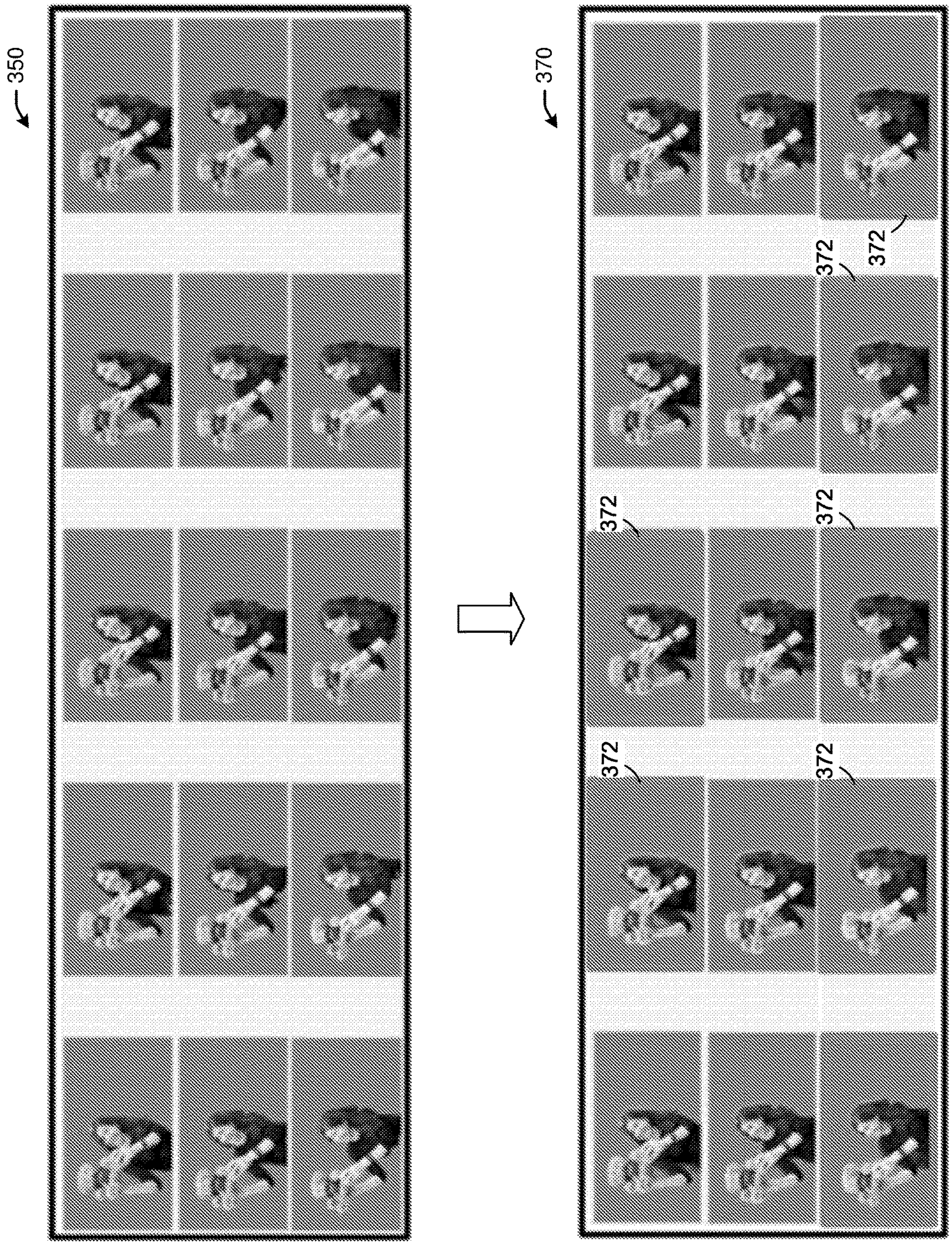
FIG. 3B shows example foreground masks for the video frames of FIG. 3A estimated using deep learning-based techniques with and without the system of FIG. 1, in accordance with one or more example embodiments of the present disclosure.

FIG. 3B shows example foreground masks for the video frames 300 of FIG. 3A estimated using deep learning-based techniques with and without the system 100 of FIG. 1, in accordance with one or more example embodiments of the present disclosure.

Referring to FIG. 3, foreground masks 350 may be estimated using a deep learning-based background matting network using a single background frame as a guide to estimate the alpha mattes (e.g., not using the multi-view enhancement network 104 of FIG. 1). Foreground masks 370 may be estimated using the system 100 of FIG. 1. Boxes 372 are used to highlight estimated foregrounds that are improved (e.g., relative to the boxes 322 of FIG. 3A) by using the two neural networks of FIG. 1, especially the multi-view enhancement network 104.

Figure 4A:
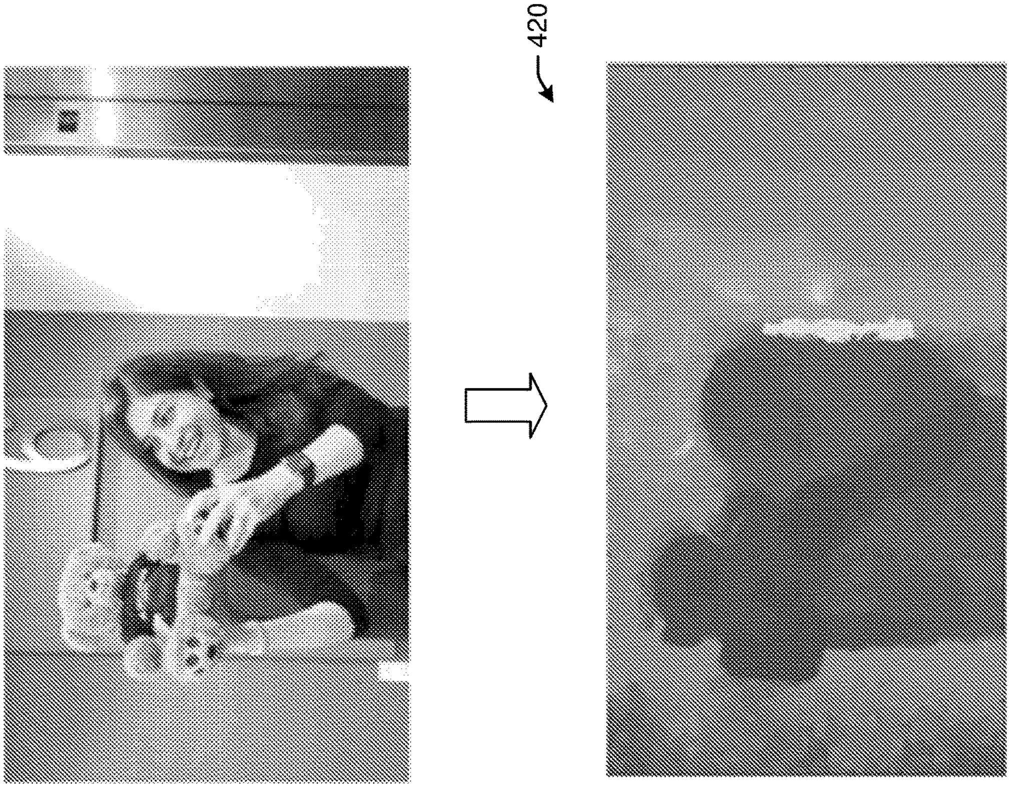
FIG. 4A shows an example video frame and its corresponding depth map generated using the process of FIG. 2, in accordance with one or more example embodiments of the present disclosure.

FIG. 4A shows an example video frame 400 and its corresponding depth map 420 generated using the process of FIG. 2, in accordance with one or more example embodiments of the present disclosure.

Referring to FIG. 4A, the video frame 400 may be captured by one of the cameras 101 of FIG. 1.

Figure 4B:
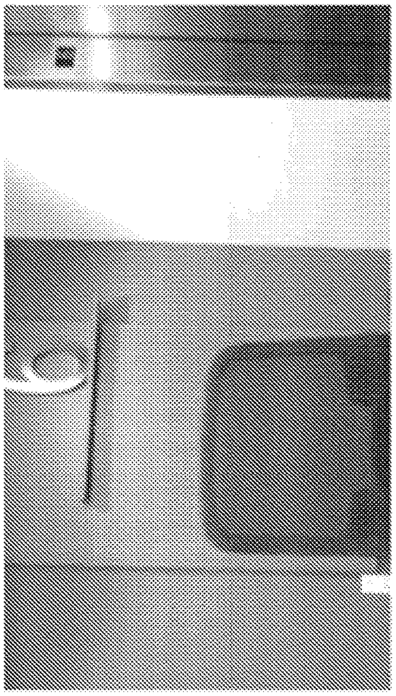
FIG. 4B shows an example background frame for the video frame of FIG. 4A and a foreground estimate of the video frame of FIG. 4A using the background frame, in accordance with one or more example embodiments of the present disclosure.
Figure 4B:

FIG. 4B shows an example background frame 440 for the video frame 400 of FIG. 4A and a foreground estimate 450 of the video frame 400 of FIG. 4A using the background frame, in accordance with one or more example embodiments of the present disclosure.

Referring to FIG. 4B, the background frame 440 may be used in generating ground truth results, and the foreground estimate 450 may be generated using the background frame 440.

Figure 4C:
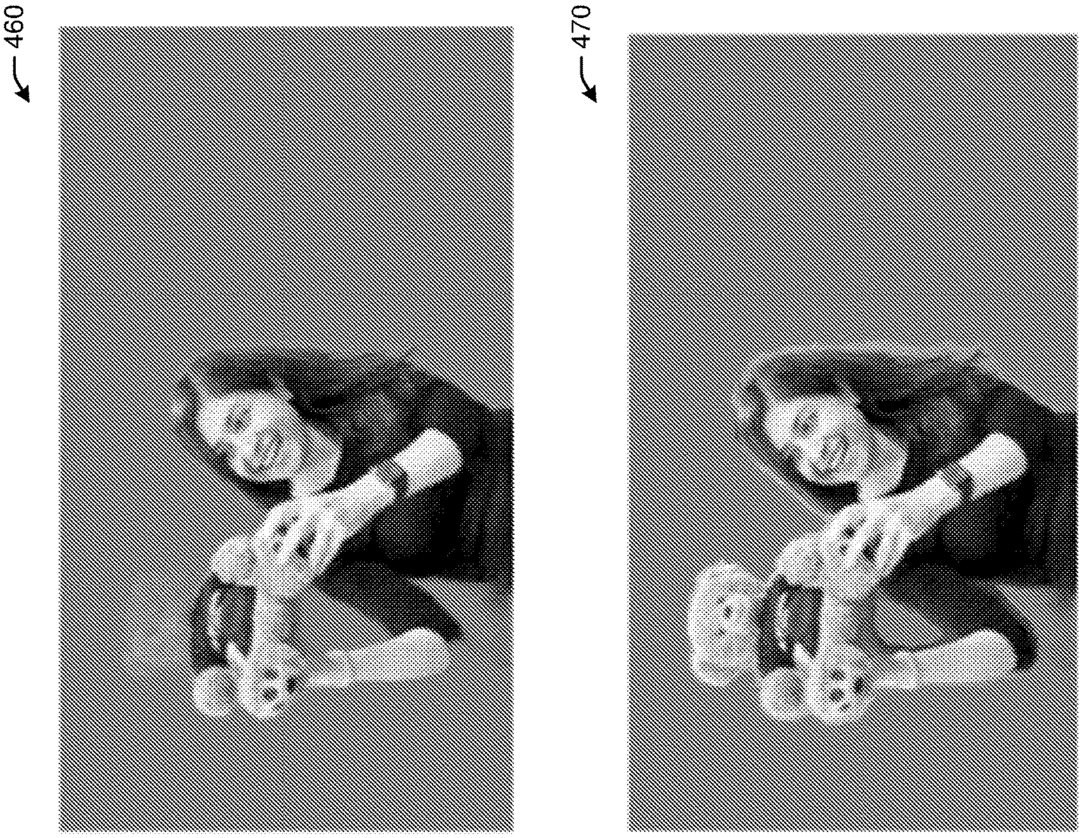
FIG. 4C shows an example foreground estimate of the video frame of FIG. 4A without using the system of FIG. 1 and an example foreground estimate of the video frame of FIG. 4A using the system of FIG. 1, in accordance with one or more example embodiments of the present disclosure.

FIG. 4C shows an example foreground estimate 460 of the video frame 400 of FIG. 4A without using the system 100 of FIG. 1 and an example foreground estimate 470 of the video frame 400 of FIG. 4A using the system 100 of FIG. 1, in accordance with one or more example embodiments of the present disclosure.

Referring to FIG. 4C, it is shown that the system 100 of FIG. 1 using the multi-view enhancement network 104 provides a better foreground estimate that includes both a person and an object.

Figure 5:
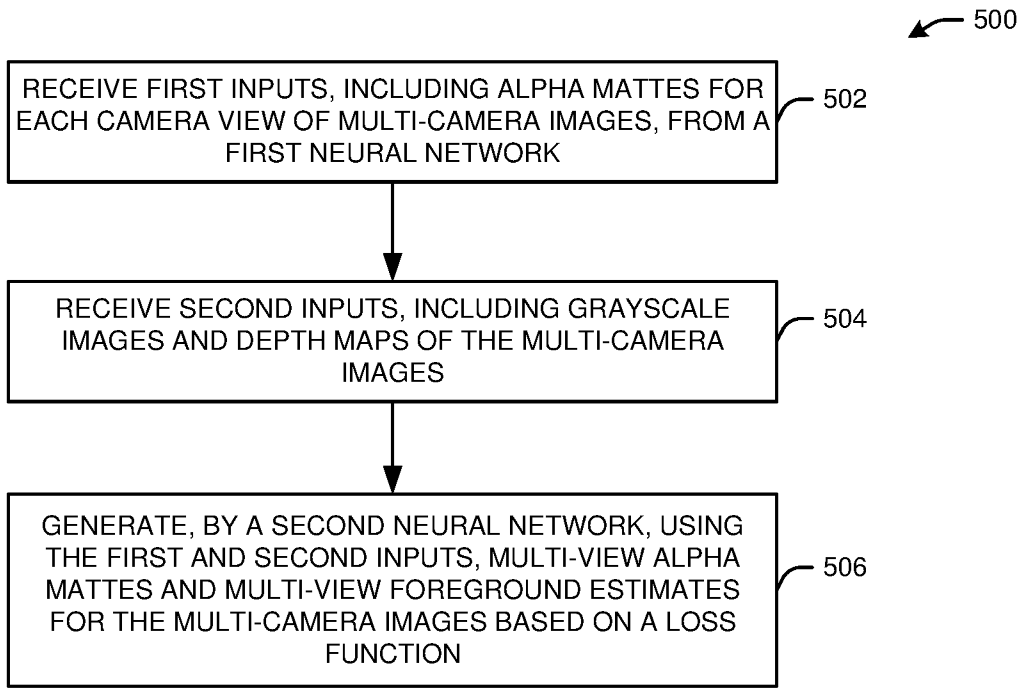
FIG. 5 illustrates a flow diagram of an illustrative process for multi-camera view background matting, in accordance with one or more example embodiments of the present disclosure.

FIG. 5 illustrates a flow diagram of an illustrative process 500 for multi-camera view background matting, in accordance with one or more example embodiments of the present disclosure.

At block 502, a system (or device, e.g., of the multi-view enhancement network 104 of FIG. 1) may receive, from another neural network (e.g., the video matting network 102 of FIG. 1), first inputs, including alpha mattes from each camera view of a multi-view images captured by multiple cameras (e.g., the cameras 101 of FIG. 1).

At block 504, the system may receive second inputs, such as grayscale images and depth maps of the multi-camera images. The system may be trained using ground truth alpha mattes and ground truth foreground estimates to minimize the loss function of Equation (1) above. The training may include multiple iterations in which the system may adjust its weights until the loss function across all the views of the multi-camera images no longer decrease. At this point, the system may represent a trained neural network capable of generating alpha mattes and foreground estimates for any first inputs received from multiple cameras.

At block 506, the system may generate, using the first and second inputs, multi-view alpha mattes and foreground estimates that minimize the loss function between estimated and ground truth alpha mattes and foreground estimates.

It is understood that the above descriptions are for purposes of illustration and are not meant to be limiting.

Figure 6:
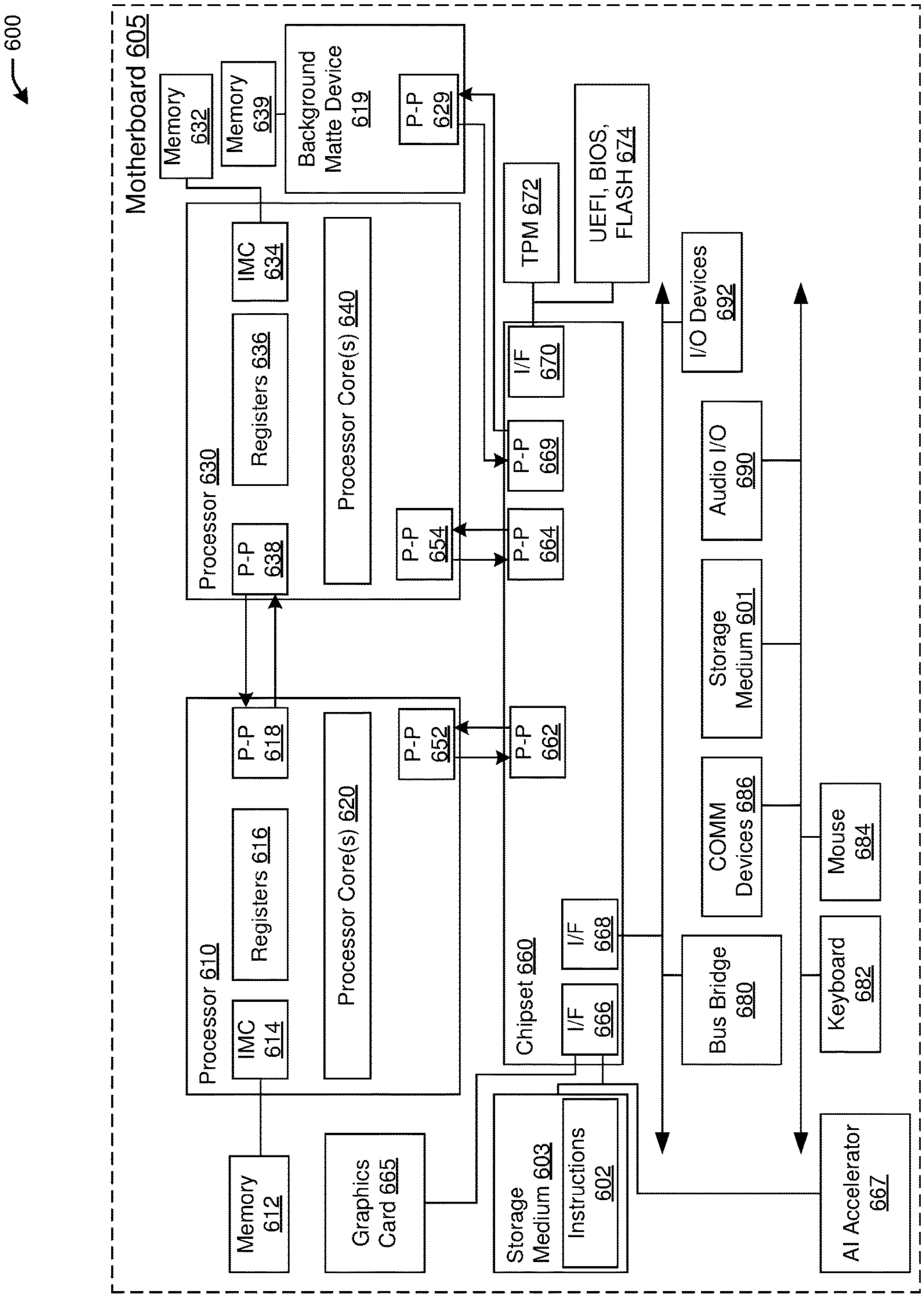
FIG. 6 illustrates an embodiment of an exemplary system, in accordance with one or more example embodiments of the present disclosure.

FIG. 6 illustrates an embodiment of an exemplary system 600, in accordance with one or more example embodiments of the present disclosure.

In various embodiments, the system 600 may comprise or be implemented as part of an electronic device.

In some embodiments, the system 600 may be representative, for example, of a computer system that implements one or more components of FIG. 1.

The embodiments are not limited in this context. More generally, the system 600 is configured to implement all logic, systems, processes, logic flows, methods, equations, apparatuses, and functionality described herein and with reference to the figures.

The system 600 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other devices for processing, displaying, or transmitting information. Similar embodiments may comprise, e.g., entertainment devices such as a portable music player or a portable video player, a smartphone or other cellular phones, a telephone, a digital video camera, a digital still camera, an external storage device, or the like. Further embodiments implement larger-scale server configurations. In other embodiments, the system 600 may have a single processor with one core or more than one processor. Note that the term "processor" refers to a processor with a single core or a processor package with multiple processor cores.

In at least one embodiment, the computing system 600 is representative of one or more components of FIG. 1. More generally, the computing system 600 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 600. For example, a component can be but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard 605 for mounting platform components. The motherboard 605 is a point-to-point (P-P) interconnect platform that includes a processor 610, a processor 630 coupled via a P-P interconnects/interfaces as an Ultra Path Interconnect (UPI), and a background matte device 619 (e.g., using one or more tensor processors or other hardware configured to execute deep neural network machine learning). In other embodiments, the system 600 may be of another bus architecture, such as a multi-drop bus. Furthermore, each of processors 610 and 630 may be processor packages with multiple processor cores. As an example, processors 610 and 630 are shown to include processor core(s) 620 and 640, respectively. While the system 600 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 610 and the chipset 660. Some platforms may include additional components and some platforms may only include sockets to mount the processors and/or the chipset.

The processors 610 and 630 can be any of various commercially available processors, including without limitation an Intel® Celeron®, Core®, Core (2) Duo®, Itanium®, Pentium®, Xeon®, and XScale® processors; AMD® Athlon®, Duron®, and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 610, and 630.

The processor 610 includes an integrated memory controller (IMC) 614 and P-P interconnects/interfaces 618 and 652. Similarly, the processor 630 includes an IMC 634 and P-P interconnects/interfaces 638 and 654. The IMC's 614 and 634 couple the processors 610 and 630, respectively, to respective memories, a memory 612, and a memory 632. The memories 612 and 632 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 612 and 632 locally attach to the respective processors 610 and 630.

In addition to the processors 610 and 630, the system 600 may include the background matte device 619. The background matte device 619 may be connected to chipset 660 by means of P-P interconnects/interfaces 629 and 669. The background matte device 619 may also be connected to a memory 639. In some embodiments, the background matte device 619 may be connected to at least one of the processors 610 and 630. In other embodiments, the memories 612, 632, and 639 may couple with the processor 610 and 630, and the background matte device 619 via a bus and shared memory hub.

System 600 includes chipset 660 coupled to processors 610 and 630. Furthermore, chipset 660 can be coupled to storage medium 603, for example, via an interface (I/F) 666. The I/F 666 may be, for example, a Peripheral Component Interconnect-enhanced (PCI-e). The processors 610, 630, and the background matte device 619 may access the storage medium 603 through chipset 660.

Storage medium 603 may comprise any non-transitory computer-readable storage medium or machine-readable storage medium, such as an optical, magnetic, or semiconductor storage medium. In various embodiments, storage medium 603 may comprise an article of manufacture. In some embodiments, storage medium 603 may store computer-executable instructions, such as computer-executable instructions 602 to implement one or more of processes or operations described herein, (e.g., process 500 of FIG. 5). The storage medium 603 may store computer-executable instructions for any equations depicted above. The storage medium 603 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 610 couples to a chipset 660 via P-P interconnects/interfaces 652 and 662 and the processor 630 couples to a chipset 660 via P-P interconnects/interfaces 654 and 664. Direct Media Interfaces (DMIs) may couple the P-P interconnects/interfaces 652 and 662 and the P-P interconnects/interfaces 654 and 664, respectively. The DMI may be a high-speed interconnect that facilitates, e.g., eight Giga Transfers per second (GT/s) such as DMI 3.0. In other embodiments, the processors 610 and 630 may interconnect via a bus.

The chipset 660 may comprise a controller hub such as a platform controller hub (PCH). The chipset 660 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 660 may comprise more than one controller hub such as a chipset with a memory controller hub, a graphics controller hub, and an input/output (I/O) controller hub.

In the present embodiment, the chipset 660 couples with a trusted platform module (TPM) 672 and the UEFI, BIOS, Flash component 674 via an interface (I/F) 670. The TPM 672 is a dedicated microcontroller designed to secure hardware by integrating cryptographic keys into devices. The UEFI, BIOS, Flash component 674 may provide pre-boot code.

Furthermore, chipset 660 includes the I/F 666 to couple chipset 660 with a high-performance graphics engine, graphics card 665. In other embodiments, the system 600 may include a flexible display interface (FDI) between the processors 610 and 630 and the chipset 660. The FDI interconnects a graphics processor core in a processor with the chipset 660.

Various I/O devices 692 couple to the bus 681, along with a bus bridge 680 that couples the bus 681 to a second bus 691 and an I/F 668 that connects the bus 681 with the chipset 660. In one embodiment, the second bus 691 may be a low pin count (LPC) bus. Various devices may couple to the second bus 691 including, for example, a keyboard 682, a mouse 684, communication devices 686, a storage medium 601, and an audio I/O 690.

The artificial intelligence (AI) accelerator 667 may be circuitry arranged to perform computations related to AI (e.g., the process 500). The AI accelerator 667 may be connected to storage medium 601 and chipset 660. The AI accelerator 667 may deliver the processing power and energy efficiency needed to enable abundant data computing. The AI accelerator 667 is a class of specialized hardware accelerators or computer systems designed to accelerate artificial intelligence and machine learning applications, including artificial neural networks and machine vision. The AI accelerator 667 may be applicable to algorithms for robotics, internet of things, other data-intensive and/or sensor-driven tasks.

Many of the I/O devices 692, communication devices 686, and the storage medium 601 may reside on the motherboard 605 while the keyboard 682 and the mouse 684 may be add-on peripherals. In other embodiments, some or all the I/O devices 692, communication devices 686, and the storage medium 601 are add-on peripherals and do not reside on the motherboard 605.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions that, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components.

Integrated circuits, processor packages, chip packages, and chipsets may comprise one or more processors.

Processors may receive signals such as instructions and/or data at the input(s) and process the signals to generate at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Various example embodiments are provided below.

Example 1 may include a method for generating multi-camera background mattes for video, the method comprising: receiving, by a first neural network trained to generate alpha mattes and foreground estimates of multi-camera images, first inputs generated by a second neural network; receiving, by the first neural network, second inputs comprising grayscale images and depth maps of the multi-camera images; and generating, by the first neural network, based on the first inputs and the second inputs, multi-view alpha mattes and multi-view foreground estimates for the multi-camera images.

Example 2 may include the method of example 1 and/or any other example herein, wherein the multi-view alpha mattes and the multi-view foreground estimates are generated based on a loss function.

Example 3 may include the method of example 2 and/or any other example herein, wherein the loss function minimizes a difference between predicted alpha mattes and ground truth alpha mattes for the multi-camera images.

Example 4 may include the method of example 3 and/or any other example herein, wherein the first neural network is trained using the ground truth alpha mattes.

Example 5 may include the method of example 2 and/or any other example herein, wherein the loss function minimizes a difference between predicted foreground estimates and ground truth foreground estimates for the multi-camera images.

Example 6 may include the method of example 5 and/or any other example herein, wherein the first neural network is trained using the ground truth foreground estimates.

Example 7 may include the method of example 1 and/or any other example herein, wherein the first neural network is a deep learning-based neural network.

Example 8 may include the method of example 1 and/or any other example herein, wherein the first inputs comprise alpha mattes for each camera view of the multi-camera images.

Example 9 may include a non-transitory computer-readable medium storing computer-executable instructions, associated with video background matte generation, which when executed by one or more processors result in performing operations comprising: receive, using a first neural network trained to generate alpha mattes and foreground estimates of multi-camera images, first inputs generated by a second neural network; receive, using the first neural network, second inputs comprising grayscale images and depth maps of the multi-camera images; and generate, using the first neural network, based on the first inputs and the second inputs, multi-view alpha mattes and multi-view foreground estimates for the multi-camera images.

Example 10 may include the non-transitory computer-readable medium of example 9 and/or any other example herein, wherein the multi-view alpha mattes and the multi-view foreground estimates are generated based on a loss function.

Example 11 may include the non-transitory computer-readable medium of example 10 and/or any other example herein, wherein the loss function minimizes a difference between predicted alpha mattes and ground truth alpha mattes for the multi-camera images.

Example 12 may include the non-transitory computer-readable medium of example 11 and/or any other example herein, wherein the first neural network is trained using the ground truth alpha mattes.

Example 13 may include the non-transitory computer-readable medium of example 10 and/or any other example herein, wherein the loss function minimizes a difference between predicted foreground estimates and ground truth foreground estimates for the multi-camera images.

Example 14 may include the non-transitory computer-readable medium of example 13 and/or any other example herein, wherein the first neural network is trained using the ground truth foreground estimates.

Example 15 may include the non-transitory computer-readable medium of example 9 and/or any other example herein, wherein the first neural network is a deep learning-based neural network.

Example 16 may include the non-transitory computer-readable medium of example 9 and/or any other example herein, wherein the first inputs comprise alpha mattes for each camera view of the multi-camera images.

Example 17 may include a device for video background matte generation, the device comprising memory storing instructions associated with the video background matte generation, the memory coupled to at least one processor configured to: receive, using a first neural network trained to generate alpha mattes and foreground estimates of multi-camera images, first inputs generated by a second neural network; receive, using the first neural network, second inputs comprising grayscale images and depth maps of the multi-camera images; and generate, using the first neural network, based on the first inputs and the second inputs, multi-view alpha mattes and multi-view foreground estimates for the multi-camera images.

Example 18 may include the device of example 17 and/or any other example herein, wherein the multi-view alpha mattes and the multi-view foreground estimates are generated based on a loss function.

Example 19 may include the device of example 18 and/or any other example herein, wherein the loss function minimizes a difference between predicted alpha mattes and ground truth alpha mattes for the multi-camera images.

Example 20 may include the device of example 19 and/or any other example herein, wherein the first neural network is trained using the ground truth alpha mattes.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:

providing first inputs and second inputs in parallel to a first neural network, the first inputs including a plurality of estimated alpha mattes generated by a second neural network for a corresponding plurality of camera views associated with multi-camera images, the second inputs including a plurality of grayscale images and a plurality of depth maps corresponding to the plurality of camera views associated with the multi-camera images; and training the first neural network based on the first inputs, the second inputs, and a loss function to generate a plurality of multi-view alpha mattes and a plurality of multi-view foreground image estimates for the multi-camera images, the loss function based on a first plurality of differences and a second plurality of differences, the first plurality of differences between ones of a plurality of ground-truth alpha mattes and corresponding ones of the plurality of multi-view alpha mattes, the second plurality of differences between ones of a plurality of ground-truth foreground images and corresponding ones of the plurality of multi-view foreground image estimates.

2. The method of claim 1, wherein the loss function is based on a first sum of the first plurality of differences.

3. The method of claim 2, wherein the loss function is based on a second sum of the second plurality of differences.

4. The method of claim 3, wherein the loss function is based on addition of the first sum and the second sum.

5. The method of claim 1, wherein the first neural network includes at least one of a recurrent neural network, a convolutional neural network, or a generative adversarial neural network.

6. The method of claim 1, including:

generating, based on the multi-camera images, an optical flow map to map first coordinates of a first camera associated with a first one of the camera views to second coordinates of a second camera associated with a second one of the camera views;

determining a first value based on the first coordinates, a principle point of the first camera, and a focal point of the first camera;

determining a second value based on the second coordinates, a principle point of the second camera, and a focal point of the second camera; and determining a first one of the depth maps associated with the first one of the camera views based on the first value and the second value.

7. A non-transitory computer-readable medium comprising computer-executable instructions to cause at least one processor circuit to at least:

provide first inputs and second inputs in parallel to a first neural network, the first inputs including a plurality of estimated alpha mattes generated by a second neural network for a corresponding plurality of camera views associated with multi-camera images, the second inputs including a plurality of grayscale images and a plurality of depth maps corresponding to the plurality of camera views associated with the multi-camera images; and train the first neural network based on the first inputs, the second inputs, and a loss function to generate a plurality of multi-view alpha mattes and a plurality of multi-view foreground image estimates for the multi-camera images, the loss function based on a first plurality of differences and a second plurality of differences, the first plurality of differences between ones of a plurality of ground-truth alpha mattes and corresponding ones of the plurality of multi-view alpha mattes, the second plurality of differences between ones of a plurality of ground-truth foreground images and corresponding ones of the plurality of multi-view foreground image estimates.

8. The non-transitory computer-readable medium of claim 7, wherein the loss function is based on a first sum of the first plurality of differences.

9. The non-transitory computer-readable medium of claim 8, wherein the loss function is based on a second sum of the second plurality of differences.

10. The non-transitory computer-readable medium of claim 9, wherein the loss function is based on addition of the first sum and the second sum.

11. The non-transitory computer-readable medium of claim 7, wherein the first neural network includes at least one of a recurrent neural network, a convolutional neural network, or a generative adversarial neural network.

12. The non-transitory computer-readable medium of claim 7, wherein the instructions are to cause one or more of the at least one processor circuit to:

generate, based on the multi-camera images, an optical flow map to map first coordinates of a first camera associated with a first one of the camera views to second coordinates of a second camera associated with a second one of the camera views;

determine a first value based on the first coordinates, a principle point of the first camera, and a focal point of the first camera;

determine a second value based on the second coordinates, a principle point of the second camera, and a focal point of the second camera; and determine a first one of the depth maps associated with the first one of the camera views based on the first value and the second value.

13. The non-transitory computer-readable medium of claim 12, wherein the instructions are to cause one or more of the at least one processor circuit to:

determine the first value based on a first rotation matrix associated with the first camera;

determine the second value based on a second rotation matrix associated with the second camera; and determine the first one of the depth maps based on the first value, the second value and a translation difference between the first camera and the second camera.

14. A device comprising:

memory;

instructions; and at least one processor circuit to be programmed based on the instructions to:

provide first inputs and second inputs in parallel to first neural network, the first inputs including a plurality of estimated alpha mattes generated by a second neural network for a corresponding plurality of camera views associated with multi-camera images, the second inputs comprising including a plurality of grayscale images and a plurality of depth maps corresponding to the plurality of camera views associated with the multi-camera images; and train the first neural network based on the first inputs, the second inputs, and a loss function to generate a plurality of multi-view alpha mattes and a plurality of multi-view foreground image estimates for the multi-camera images, the loss function based on a first plurality of differences and a second plurality of differences, the first plurality of differences between ones of a plurality of ground-truth alpha mattes and corresponding ones of the plurality of multi-view alpha mattes, the second plurality of differences between ones of a plurality of ground-truth foreground images and corresponding ones of the plurality of multi-view foreground image estimates.

15. The device of claim 14, wherein the loss function is based on a first sum of the first plurality of differences.

16. The device of claim 15, wherein the loss function is based on a second sum of the second plurality of differences.

17. The device of claim 16, wherein the loss function is based on addition of the first sum and the second sum.

18. The device of claim 14, wherein the first neural network includes at least one of a recurrent neural network, a convolutional neural network, or a generative adversarial neural network.

19. The device of claim 14, wherein one or more of the at least one processor circuit is to:

generate, based on the multi-camera images, an optical flow map to map first coordinates of a first camera associated with a first one of the camera views to second coordinates of a second camera associated with a second one of the camera views;

determine a first value based on the first coordinates, a principle point of the first camera, and a focal point of the first camera;

determine a second value based on the second coordinates, a principle point of the second camera, and a focal point of the second camera; and determine a first one of the depth maps associated with the first one of the camera views based on the first value and the second value.

20. The device of claim 19, wherein one or more of the at least one processor circuit is to:

determine the first value based on a first rotation matrix associated with the first camera;

determine the second value based on a second rotation matrix associated with the second camera; and determine the first one of the depth maps based on the first value, the second value and a translation difference between the first camera and the second camera.

* * * * *